United States Patent
Morimoto et al.

(10) Patent No.: US 7,388,171 B2
(45) Date of Patent: Jun. 17, 2008

(54) POWER SUPPLY APPARATUS FOR WELDER

(75) Inventors: Takeshi Morimoto, Osaka (JP); Kenzo Danjo, Osaka (JP); Yuji Ikejiri, Osaka (JP); Tetsuro Ikeda, Osaka (JP); Hideo Ishii, Osaka (JP)

(73) Assignee: Sansha Electric Manufacturing Company, Limited, Osaka-shi, Osaka-fu (JP)

( * ) Notice: Subject to any disclaimer, the term of this patent is extended or adjusted under 35 U.S.C. 154(b) by 295 days.

(21) Appl. No.: 11/228,463

(22) Filed: Sep. 16, 2005

(65) Prior Publication Data

US 2006/0054610 A1  Mar. 16, 2006

(51) Int. Cl.
*B23K 9/095* (2006.01)
*B23K 9/10* (2006.01)

(52) U.S. Cl. .................. 219/110; 219/137.2; 219/132; 219/108; 219/482; 713/323; 713/324; 713/340; 713/300

(58) Field of Classification Search ................. 219/132, 219/125.1, 137.2; 713/323
See application file for complete search history.

(56) References Cited

U.S. PATENT DOCUMENTS

| | | | |
|---|---|---|---|
| 3,477,005 A | 11/1969 | Weems | |
| 4,163,886 A * | 8/1979 | Omae et al. | ............... 219/60 A |
| 4,527,690 A | 7/1985 | Schmidts et al. | |
| 4,973,821 A | 11/1990 | Martin | |
| 5,278,390 A * | 1/1994 | Blankenship | ............. 219/130.5 |
| 5,392,438 A * | 2/1995 | Gunji | .......................... 713/323 |
| 5,539,876 A * | 7/1996 | Saito et al. | .................... 714/14 |
| 5,722,887 A | 3/1998 | Wolfson et al. | |
| 5,745,567 A | 4/1998 | Middleton | |
| 5,943,220 A | 8/1999 | Shikata et al. | |
| 6,051,806 A | 4/2000 | Shikata | |
| 6,121,889 A | 9/2000 | Janda | |
| 6,555,785 B2 | 4/2003 | Kawamoto et al. | |
| 6,596,972 B1 | 7/2003 | Di Novo | |
| 6,825,441 B2 | 11/2004 | Katooka et al. | |

FOREIGN PATENT DOCUMENTS

| | | |
|---|---|---|
| EP | 0198347 | 10/1986 |
| GB | 1549399 | 8/1979 |
| GB | 2278501 | 11/1994 |
| GB | 2314685 | 1/1998 |
| JP | 2003-136241 A | 5/2003 |

* cited by examiner

*Primary Examiner*—Jerry Lorengo
*Assistant Examiner*—Erin P Barry
(74) *Attorney, Agent, or Firm*—Duane Morris LLP

(57) ABSTRACT

Welding conditions are set for a power supply apparatus for use with a welding machine, using a control panel unit (96). A memory (105) stores therein welding conditions as set through the control unit (96), and holds the set welding conditions after turning off of a main power supply switch (1) of the power supply apparatus. Upon turning on of the main power switch (1) for starting welding, the welding conditions stored and held in the memory (105) are read out and set in the power supply apparatus.

2 Claims, 3 Drawing Sheets

POWER SUPPLY APPARATUS FOR WELDER

This invention relates to a power supply apparatus for use with a welding machine and, more particularly, to an arrangement for setting welding conditions.

BACKGROUND OF THE INVENTION

There are various modes of welding, including manual welding, DC TIG welding and AC TIG welding, which have required corresponding types of power supply apparatuses.

Providing various types of power supply apparatuses for respective types of welding machines increases costs for welding and also may cause problems of how to keep the apparatuses ready to operate and how to transport them to the working sites. To solve the problems, a power supply apparatus has been proposed, which has various welding conditions set therein for various welding modes. Desired welding conditions can be selected so that it can be adaptively used with various welding modes.

An example of such power supply apparatus is disclosed in Japanese Patent Application Publication No. 2003-136241 (JP 2003-136241 A). The power supply apparatus disclosed in this publication includes a control panel, on which a welding mode selecting push button switch, a current mode selecting push button switch, a pulse mode selecting push button switch, AC/DC switching push button switch, and a parameter setting unit are disposed. By selectively operating these switches, desired one of welding modes including manual welding, DC TIG welding (with high-frequency starting), AC TIG welding (with high-frequency starting), and TIG welding (with touch-starting), is selected, and various parameters required for the selected welding mode are set.

With this power supply apparatus, each time the apparatus is turned on, before starting welding, it is necessary to operate the switches and the parameter setting unit on the panel in order to select the desired welding mode and to set various parameters necessary to perform the selected welding, which is very troublesome.

An object of the present invention is to provide a power supply apparatus for a welding machine, with simplified welding mode selecting and parameter setting operations whereby preparation for the use of the power supply apparatus can be simplified.

SUMMARY OF THE INVENTION

According to one embodiment of the present invention, a power supply apparatus for a welding machine includes a control panel unit for setting welding conditions including welding modes and various parameters required for the respective welding modes, and memory means for storing the welding conditions set through the control panel unit. The memory means holds the set conditions even after supply of power to the power supply apparatus is stopped. When the power supply is resumed, the welding conditions stored in the memory means are read out and set in the power supply apparatus.

The memory means may store therein welding conditions set for a preceding welding operation so that, when the power supply apparatus is turned on, the welding conditions of the preceding welding can be set in the power supply apparatus.

According to another embodiment of the invention, a power supply apparatus for a welding machine includes a control panel unit for setting welding conditions including welding modes and parameters required for the respective welding modes, memory means for storing the welding conditions set through the control panel unit, storage instruction means for instructing the memory means to store therein a plurality of welding conditions set through the control panel unit, and reading instruction means for reading out, from the memory means, a desired welding condition out of the plural welding conditions stored in the memory means and setting the read out welding condition in the power supply apparatus.

In the power supply apparatus according to each of the first and second aspects, it may be so arranged that, when a peak current is set for a desired welding mode, a base current, an initial current, a crater current and an after-flow current can be automatically set according to the set peak current, and a hot-start current, a pulse width, a pre-flow time period, an up-ramping time period and a down-ramping time period can be set to predetermined fixed values.

In the power supply apparatus according to each of the first and second aspects, it may be so arranged that, when a peak current is set for a desired welding mode, a base current, an initial current, a crater current, an after-flow current, an up-ramping time period and a down-ramping time period can be automatically set according to the set peak current, and a hot-start current, a pulse width, and a pre-flow time period can be set to predetermined fixed values.

DESCRIPTION OF PREFERRED EMBODIMENTS

Figure 1:
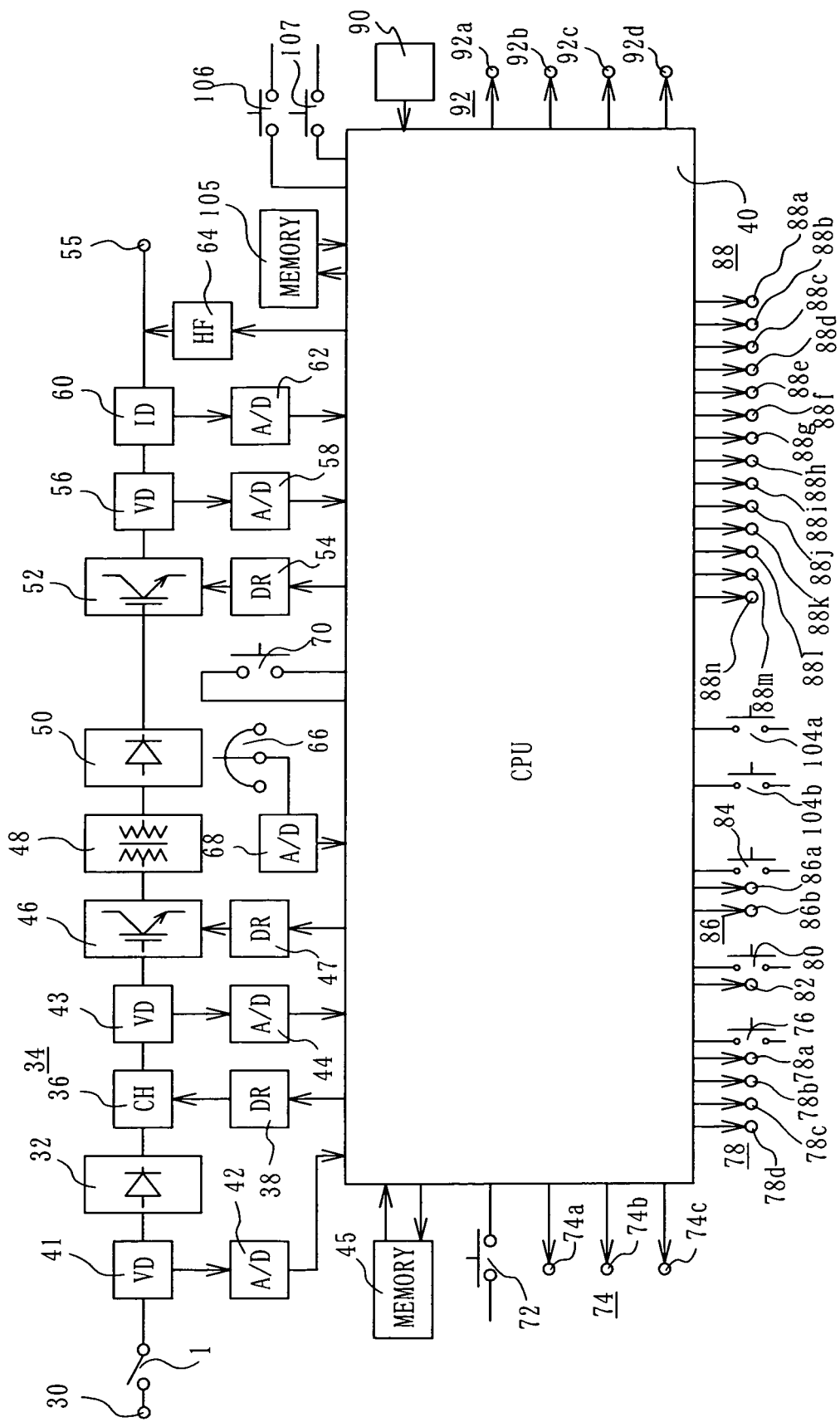
FIG. 1 is a block circuit diagram of a power supply apparatus for a welding machine according to one embodiment of the present invention.

A power supply apparatus for a welding machine shown in FIG. 1 can be used in any of manual welding, DC TIG welding and AC TIG welding modes, and includes a main power switch 1 for turning on and off the power supply apparatus itself, and a power supply input terminal 30 to which an AC signal, e.g. a commercial AC voltage, is supplied. Actually, the power supply terminal 30 is composed of two terminals, between which a single-phase commercial AC voltage is applied. In place of a single-phase AC voltage, a three-phase commercial AC voltage may be used. In this case, the input terminal 30 is composed of three terminals. The power supply input terminal 30 is connected to an input-side AC-to-DC converter unit 32, where it is converted to a DC signal, e.g. a DC voltage. The input-side AC-to-DC converter unit 32 may be formed of rectifiers and a smoothing capacitor.

A DC voltage from the input-side AC-to-DC converter unit 32 is coupled to a constant voltage device 34, which includes switching means, e.g. a chopper circuit 36. The chopper circuit 36 includes semiconductor switching devices, e.g. IGBTs, power FETs or power bipolar transistors, and is ON-OFF controlled by a control signal, e.g. a PWM drive signal, supplied by chopper control means, e.g.

a chopper drive circuit 38. The chopper drive circuit 38 generates the PWM drive signal in response to a command provided by a CPU 40. The input voltage at the power supply input terminal 30 is detected by an input voltage detector 41. An input voltage representative signal representing the input voltage from the detector 41 is converted into a digital input voltage representative signal by an analog-to-digital converter 42, and the resultant digital signal is applied to the CPU 40. Also, an output voltage of the chopper circuit 36 is detected by a chopper output voltage detector 43, which generates a chopper output voltage representative signal representing the output voltage of the chopper circuit 36. This chopper output voltage representative signal is converted into a digital chopper output voltage representative signal by an analog-to-digital converter 44, and the resulting digital signal is applied to the CPU 40. The CPU 40 provides arithmetic operations on the digital input and output voltage representative signals in accordance with data stored in memory means, e.g. a memory 45, and controls the PWM drive signal generated by the drive circuit 38 in such a manner as to make the chopper output voltage to be a predetermined voltage. In this manner, whichever one of different voltages, e.g. voltages of 200 V and 400 V, is applied to the input terminal 30, the constant voltage device 34 outputs the predetermined fixed voltage.

The output voltage of the constant voltage device 34 is applied to a DC-to-AC converter unit, e.g. a high frequency inverter 46. The inverter 46 may include semiconductor switching devices similar to the ones used for the chopper circuit 36, which are connected in, for example, a full-bridge configuration. The semiconductor switching devices are ON-OFF controlled by a control signal, e.g. a PWM drive signal, supplied by inverter control means, e.g. an inverter drive circuit 47, so that the output voltage of the constant voltage device 34 can be converted to a high-frequency voltage having a frequency in a range between, for example, ten-odd kilohertz (KHz) and several hundred kilohertz (KHz). The inverter drive circuit 47 is controlled by the CPU 40, as will be described later. In place of the high frequency inverter 46, a chopper circuit may be used.

The high frequency voltage from the inverter 46 is applied to a transformer 48, where it is voltage-transformed to a high frequency voltage having a predetermined magnitude. The resulting high frequency voltage, in turn, is applied to an output-side high-frequency-to-DC converter 50, where it is converted to a DC voltage. The high-frequency-to-DC converter 50 may include, for example, rectifiers and smoothing reactors.

The DC voltage from the output-side high-frequency-to-DC converter unit 50 is applied to an AC/DC switching unit 52. The switching unit 52 includes an inverter formed of semiconductor switching devices, similar to the ones used for the chopper circuit 36, connected in a full-bridge configuration. The semiconductor switching devices are ON-OFF controlled by a control signal, e.g. a PWM drive signal, supplied by switching unit control means, e.g. a switching unit drive circuit 54. When receiving a switch-to-AC command from the CPU 40, the drive circuit 54 operates to PWM-control the respective semiconductor switching devices by applying control signals, e.g. PWM control signals, the switching devices in such a manner that an AC voltage, having a frequency lower than that of the output voltage of the high frequency inverter 46, which is between, for example, ten-odd hertz (Hz) and 200 Hz, can be outputted. When receiving a switch-to-DC command from the CPU 40, the drive circuit 54 makes two semiconductor switching devices continuously conductive, which two semiconductor switching devices are connected in series with a load, described later, interposed between them and causes a DC voltage to be applied continuously to the load. Depending on which one of positive and negative polarity DC voltage should be applied to the load, the type of the semiconductor switching devices to be used is determined.

In place of the above-described arrangement, the output-side high-frequency-to-DC converter unit 50 may be provided with a positive-polarity output terminal, a negative-polarity output terminal, and a return terminal, with the positive-polarity output terminal connected through a chopper circuit to a first end of the load, with the negative-polarity output terminal connected through another chopper circuit to the first end of the load, and with the return terminal connected to the other, second end of the load. With this arrangement, the two chopper circuits are alternately turned on and off when an AC voltage is to be applied to the load, and one of the two chopper circuits is continuously made conductive when a DC voltage is to be applied to the load.

The output voltage (load voltage) of the AC/DC switching unit 52 is coupled to an output terminal 55. Actually, the output terminal 55 is composed of two, positive and negative, terminals, one of which is connected to a workpiece, or load, and the other of which is connected to a welding electrode generating an arc between it and the workpiece.

The output voltage of the AC/DC switching unit 52 is detected by an output voltage detector 56, which develops an output voltage representative signal representing the output voltage of the AC/DC switching unit 52. An analog-to-digital converter 58 converts the output voltage representative signal to a digital form, which is then applied to the CPU 40. Also, an output current (load current) of the AC/DC switching unit 52 is detected by an output current detector 60, which develops an output current representative signal representing an output current of the AC/DC switching unit 52. An analog-to-digital converter 62 converts the output current representative signal to a digital form, which is applied to the CPU 40. In accordance with the digital output voltage representative signal and/or the digital output current representative signal, the CPU 40 supplies the inverter drive circuit 47 with a command to cause the circuit 47 to develop such PWM drive signals as to make the output voltage and/or output current have predetermined values.

A high frequency generator 64 is connected to the output terminals 55. The high frequency generator 64 develops, between the two output terminals 55, a high frequency voltage at a frequency in a range between, for example, 1 MHz and 3 MHz having a magnitude in a range between, for example, 5 kV and 20 kV, for a relative short, predetermined period, to cause an arc to be generated between the workpiece and the welding electrode. Start and stop control of the high frequency generator 64 is made by the CPU 40.

The CPU 40 is programmed to deal with manual welding, TIG welding (with high frequency starting), TIG welding (with touch starting) and AC-DC TIG welding. The high frequency generator 64 is detachably connected to a case 94 of the power supply apparatus when required.

In order to operate this power supply apparatus appropriately, various parameters must be set. First one of such parameters is a reference current signal, which is a signal representative of a current to be supplied as a load current when the apparatus is constant-current controlled for manual welding and TIG welding. This signal is set through a controller, e.g. a first parameter commander, or, more specifically, an output setter 66, and is converted to a digital reference current signal by an analog-to-digital converter 68 before it is supplied to the CPU 40. The setter 66 is of an encoder type and acts also as a push button switch 70 for use in changing modes and etc.

The CPU 40 is provided with a mode controller, e.g. mode setting means, or, more specifically, a mode setting push button switch 72, and also a mode indicator 74. The mode indicator 74 has three indicator lamps 74a, 74b and 74c for manual welding, TIG welding (with high frequency starting) and TIG welding (with touch starting), respectively. When the mode setting push button switch 72 in its initial state is pressed once, the CPU 40 commands the manual welding mode to be activated, which is indicated by the turning on of the indicator lamp 74a. When the switch 72 is pressed again, the CPU 40 commands the power supply apparatus to change its mode from the manual welding mode to the TIG welding (with high frequency starting) mode, which is indicated by the turning on of the lamp 74b. When the push button switch 72 is pressed down again, the power supply apparatus is changed to the TIG welding (with touch starting) mode from the TIG welding (with high frequency starting) mode, which is indicated by the lamp 74c.

The CPU 40 is provided with another controller, e.g. a second parameter commander, or, more specifically, a current mode setting push button switch 76, and also a current mode indicator 78, which has four indicator lamps 78a, 78b, 78c and 78d for four current modes. When the push button switch 76 in its initial state is pressed once, the CPU 40 commands a standard mode in which a predetermined load current is supplied to the load, which is indicated by is the indicator lamp 78a. By pushing down the push button switch 76 once more, the CPU 40 places the power supply apparatus in a sloping mode. In the sloping mode, the slopes of up-ramping and down-ramping slopes of the load current are controlled. In up-ramping, the load current increases to a predetermined value when an initial welding current flows, and, in down-ramping, the load current decreases to a crater current from the predetermined value. In this mode, the lamp 78b is turned on. When, in the sloping mode, the push button switch 76 is pressed again, the CPU 40 switches the power supply apparatus into a repeating mode in which the sloping mode is repeated, and the lamp 78c is turned on. When, in this repeating mode, the switch 76 is pressed, the power supply apparatus is switched into a spot mode, in which a load current is supplied for a short time for temporary fixing of the workpiece, which is indicated by the lamp 78d.

Another controller, e.g. a third parameter commander, or, more specifically, a pulse mode push button switch 80, and a pulse mode indicator 82 are provided in association with the CPU 40. The pressing of the pulse mode push button switch 80 places the power supply apparatus in a pulse mode, in which the load current is a pulsating current, which is indicated by turning on of the indicator 82. Another pushing down of the switch 80 releases the apparatus from the pulse mode, and the load current becomes a DC current. This is indicated by turning off of the indicator 82.

A still another controller, e.g. a fourth parameter commander, or, more specifically, an AC/DC switching push button switch 84, and an AC/DC indicator 86. The AC/DC indicator 86 has indicator lamps 86a and 86b for indicating the DC TIG mode and the AC TIG mode. When the AC/DC switching switch 84 is pressed down once, the power supply apparatus is placed in the DC TIG mode, which is indicated by the indicator lamp 86a. When the switch 84 is pressed down again, the power supply apparatus is placed in the AC TIG mode, which is indicated by the lamp 86b.

An output mode indicator 88 is provided in association with the CPU 40. The output mode indicator 88 has fourteen (14) indicator lamps 88a through 88n. The lamp 88a is turned on when a pre-flow mode is set, in which an inert gas is supplied prior to the start of welding. The lamp 88b is turned on when a hot start current is set. The lamp 88c is turned on when an initial current is set. The lamp 88d is turned on when the up-ramping time is set. The lamp 88e is turned on when a pulse current value is set. The lamp 88f is turned on when a base current is set. The lamp 88g is turned on when the time period for which a spot current is to be interrupted is set. The lamp 88h is turned on when a pulse width is set. The lamp 88i is turned on when a pulse frequency is set. The lamp 88j is turned on when a frequency for AC welding is set. The lamp 88k is turned on when a positive/negative waveform ratio for AC welding is set. The lamp 88l is turned on when a down-ramping time is set. The lamp 88m is turned on when a crater current value is set. The lamp 88n is turned on when the apparatus is set in a post-flow mode in which the inert gas continues to be supplied even after the welding is finished.

The setter 66 is used for setting these parameters, and an output display 90 is used to display set values. A setting display 92 displays what are set, and includes indicator lamps 92a, 92b, 92c and 92d for current, ratio (%), time, and frequency.

Figure 2:
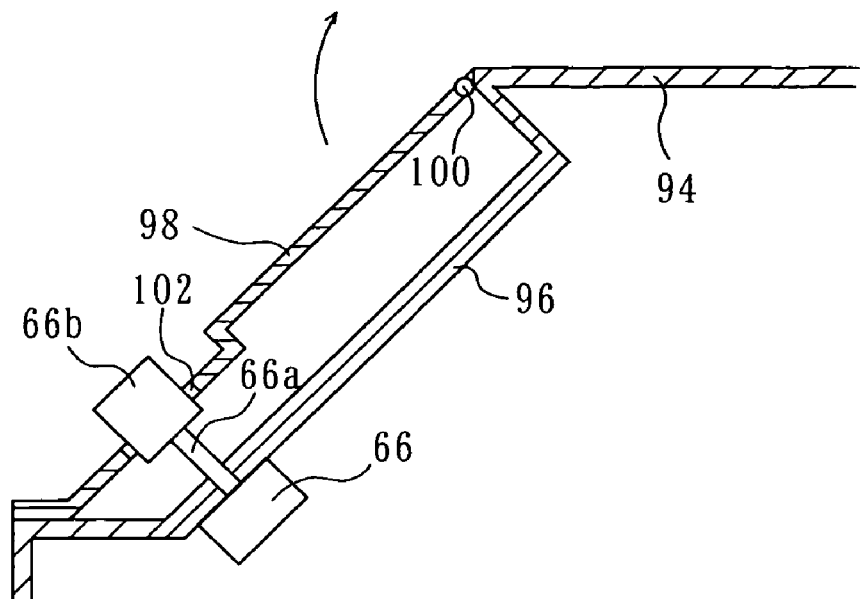
FIG. 2 is a longitudinal cross-sectional view of part of the power supply apparatus shown in FIG. 1, including a control panel unit.
Figure 4:
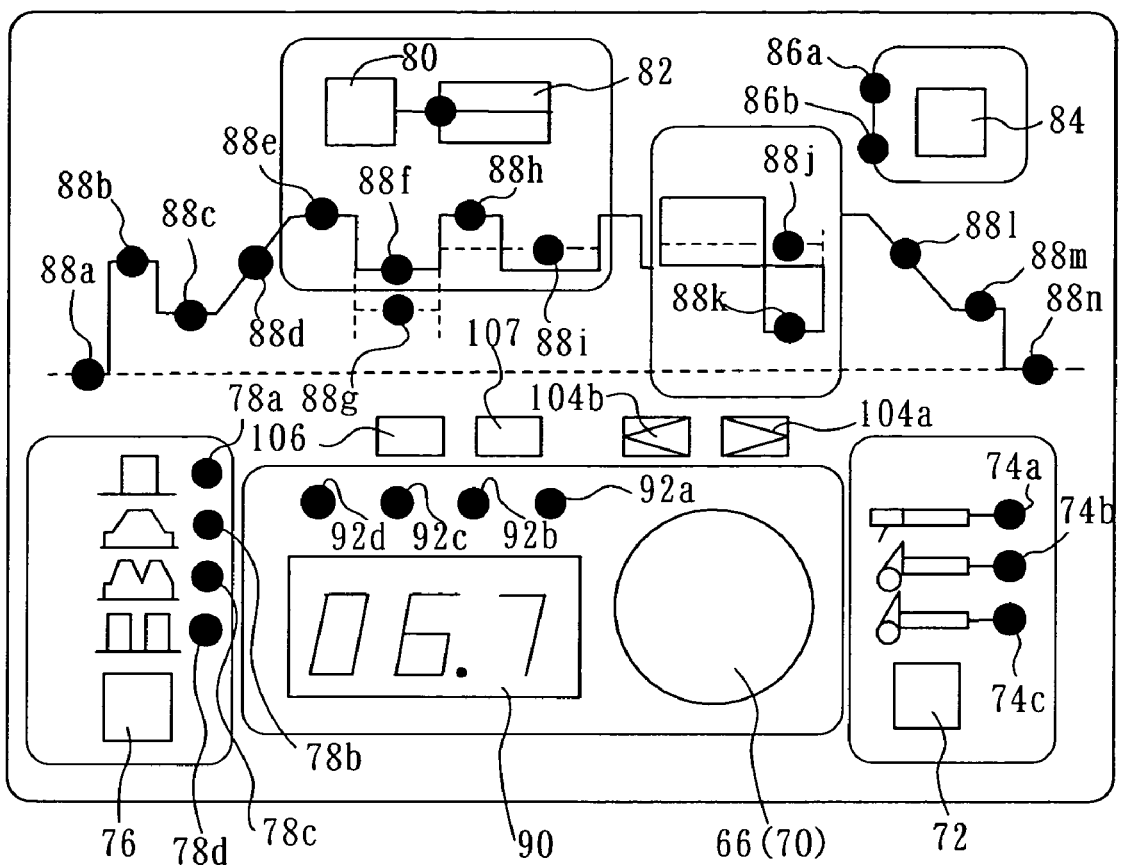
FIG. 4 is a front view of the control panel unit of the power supply apparatus shown in FIG. 1.

The setter and indicators are usually disposed on a control panel 96, which, in turn, is disposed on a case 94 as shown in FIG. 2. The front view of the control panel 96 is shown in FIG. 4. The control panel 96 has a generally rectangular shape and is disposed in a recess, which is formed in an upper portion of the front of the case 94 and faces diagonally upward.

Figure 3:
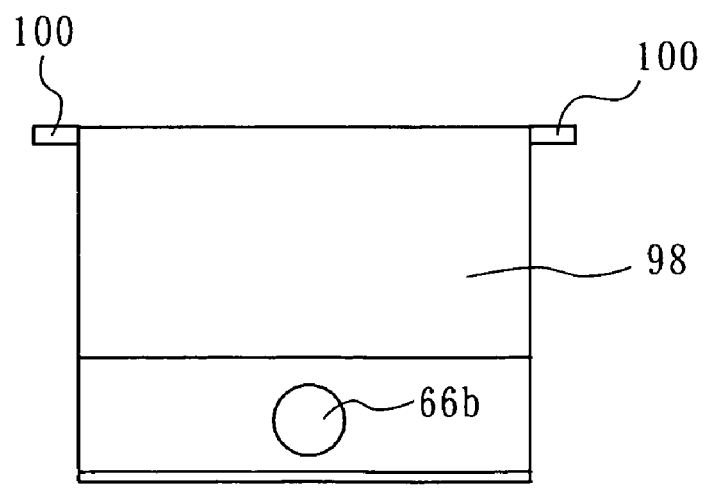
FIG. 3 is a front view of a lid used for the control panel unit shown in FIG. 2.

A drip and dust preventing transparent or semitransparent lid 98 is disposed in parallel with and spaced from the control panel 96. Rotation shafts 100 extend outward from the upper ends of the side edges of the lid 98 as shown in FIG. 3. The shafts 100 are placed in holes (not shown) formed in the side walls of the recess in the case 94, so that the lid 98 can rotate about the shafts 100 in the direction indicated by an arrow in FIG. 2 and in the opposite direction. Thus, the lid 98 can assume a closed position and an open position.

The lower portion of the lid 98 is set back toward the panel 96, and the setter 66 acting also as the push button switch 70, shown in FIG. 1, is disposed at a location in that portion of the control panel 96 which faces the setback portion of the lid 98. A control rod 66a extends from the setter 66 toward the setback portion in the lid 98, and has a control knob 66b having a short columnar shape attached at the tip end of the control rod 66a. Part of the knob 66b extends out through the lid 98 so that the knob 66b can be manipulated even when the lid 98 is in its closed position. The pushing of the knob 66b in the direction toward the panel 96 causes the switch 70 to be operated, and the rotation of the knob 66b about the rod 66a causes the setter 66 to operate. An opening 102 is formed in the lid 98, and the knob 66b is so positioned as to extend out through the opening 102. The size and shape of the opening 102 are so determined that it does not interfere with the control knob 66b when the lid 98 is opened and that the drip and dust preventing effects of the lid 98 cannot be degraded.

The set welding conditions, such as the welding modes, the values for the respective parameters for the set welding modes, the current modes, etc. are stored together in memory means, e.g. a memory 105 (FIG. 1). When the main power supply switch 1 is turned off after welding under a particular welding condition or after setting a welding condition, the welding condition for the preceding welding or the set welding condition is automatically stored and held in the memory 105.

Various set conditions, respectively including welding modes, and various parameter values for the respective welding modes set through the control panel 96 are registered and stored in the memory 105. After a welding condition, including a welding mode and parameter values for that welding mode are set through the various push button switches on the control panel 96, a welding condition storing push button 106 (FIGS. 1 and 4) is pressed, and, the setter 66 is, then, used to designate a registration number for that welding condition. Thereafter, the push button switch 70 (setter 66) is pressed, causing the set welding condition to be registered and stored under the designated registration number. After that, the main power supply switch 1 of the power supply apparatus is turned off, and the apparatus is in an OFF state or a standby state.

With the above-described arrangement, various parameters for manual welding are set in the following manner, for example. First, the lid 98 is opened and the setting push button switch 72 is pressed to select the manual welding mode. This causes the indicator lamp 74*a* to be turned on. Then, the knob 66*b* of the setter 66 is pressed down so as to actuate the setting push button switch 70, which, in turn, causes the indicator lamp 88*a* to be turned on, to thereby indicate that the hot start current is to be set. Also, the lamp 92*a* is turned on to indicate that the value to be set is that of current. Then, the knob 66*b* of the setter 66 is rotated to set the hot start current value, which is displayed on the output display 90. After that, the knob 66*b* is pressed again to actuate the setting push button switch 70, the lamp 88*f* is turned on to indicate that the welding current is to be set. At the same time, the lamp 92*a* is turned on to indicate the value to be set is that of current. The value of the welding current is set by rotating the knob 66*b* of the setter 66, which is displayed on the output display 90. This completes the setting for manual welding.

An example of setting for high frequency start of the DC TIG welding is as follows. First, the lid 98 is opened, and the welding mode setting push button switch 70 is pressed to select the high frequency starting. This causes the indicator lamp 74*b* to be turned on. Then, the current mode setting push button switch 76 to select a desired current mode, for example, the sloping mode. Then, the lamp 78*b* is turned on. After that, the pulse mode push button switch 80 is pressed to select the pulse mode, which causes the lamp 82 to be turned on. Then, the AC/DC switching push button switch 84 is pressed to select the DC welding. This causes the lamp 86*a* to be turned on.

The push button switch 70 is actuated by pressing the setter 66, causing the indicator lamp 88*b* to turn on, which indicates that the hot start current is being set. At the same time, the lamp 92*a* is turned on to indicate that the value to be set is that of current. By rotating the knob 66*b* of the setter 66, the value of the hot start current is set, and its value is displayed on the output display 90.

Then, the setter 66 is pressed down again to actuate the switch 70, causing the lamp 88*c* to turn on to indicate that the initial current is to be set, and the lamp 92*a* is turned on to show that the value to be set is that of current. In this state, the knob 66*b* of the setter is used to set the initial current value, which is displayed on the output display 90.

Another pressing down of the setter 66 to actuate the switch 70 causes the indicator lamp 88*d* to turn on, showing that the up-ramping time is to be set. This causes the lamp 92*c* to be turned on, indicating that what is to be set is time.

The knob 66*b* is used to set the time period for the up-ramping, and the value is displayed on the output display 90.

After that, the setter 66 is pressed down again to actuate the switch 70, causing the indicator lamp 88*e* to be turned on, which indicates that the peak current is to be set, and the lamp 92*a* is turned on to show that what is to be set is current. The value of the peak current is set through the knob 66*b* of the setter 66 and is displayed on the output display 90.

After that, the setter 66 is pressed down again to actuate the switch 70, causing the indicator lamp 88*f* to be turned on, which indicates that the base current is to be set, and the lamp 92*a* is turned on to show that what is to be set is current. The value of the base current is set through the knob 66*b* of the setter 66 and is displayed on the output display 90.

Then, the setter 66 is pressed down again to actuate the switch 70. This causes the indicator lamp 88*h* to be turned on, indicating that the pulse width is to be set, and, at the same time, the indicator lamp 92*b* is turned on to indicate that the value to be displayed represents a ratio in percent (%). Then, the pulse width is set by rotating the knob 66*b* of the setter 66, and the set value is displayed on the output display 90.

Another pressing of the setter 66 to actuate the switch 70 causes the indicator lamp 88*i* to turn on, which indicates that the pulse frequency is to be set. Then, the lamp 92*d* is turned on to indicate that the parameter to be set is frequency. The pulse frequency is set by rotating the knob 66*b* of the setter 66, and the set value is displayed on the output display 90.

A further pressing of the setter 66 to actuate the switch 70 causes the lamp 88*l* to turn on, indicating that the parameter to be set is the down-ramping time period. At the same time, the indicator lamp 92*c* is turned on, indicating that what is to be set is time. The down-ramping time is set through the use of the knob 66*b*, and is displayed on the output display 90.

Thereafter, when the switch 70 is actuated by pressing the setter 66, the lamp 88*m* is turned on to indicate that the crater current is to be set, and the indicator lamp 92*a* is turned on to indicate that the value to be set is current. The value of the crater current is set by using the knob 66*b* of the setter and is displayed on the output display 90. This completes the setting for the DC TIG high frequency start mode.

A switch 104*a* is for advancing by one step the processing to be achieved by the setting push button switch 70. In other words, pressing the switch 104*a* once is equivalent to pressing the switch 70 once. A switch 104*b* is for putting back the processing achieved by the switch 70. In other words, when the switch 104*b* is pressed once, the apparatus is returned to the previous setting state, from which the current state has resulted in by the pressing of the switch 70.

The AC TIG high frequency start welding mode is set in the same manner as the setting for the DC TIG high frequency start welding described above, but the setting steps after the actuation of the AC/DC switching switch 84 are different. Specifically, the AC welding mode is selected by pressing the AC/DC switching switch 84, which places the apparatus in the AC TIG high frequency start welding mode, which is indicated by turning on the indicator lamp 86*b*. After that, the same setting procedure takes place as in the DC TIG high frequency start mode until the pulse frequency is set. After that, the setter 66 is pressed down to actuate the switch 70, causing the lamp 88*j* to be turned on to indicate that the AC frequency is to be set. At the same time, the indicator lamp 92*d* is turned on to indicate that what is to be set is frequency. Then, the knob 66*b* of the setter 66 is rotated to set the AC frequency value, which is displayed on the output display 90.

After that, the setter 66 is pressed to actuate the switch 70, causing the indicator lamp 88k to be turned on to indicate that the positive/negative waveform ratio is to be set. At the same time, the lamp 92b is turned on to indicate that the value to be set is that of a ratio (%). The knob 66b is rotated to set the ratio, and the value is displayed on the output display 90. This completes the setting procedure for the AC TIG high frequency welding.

For the AC TIG touch-start welding mode, the lid 98 is opened and the touch start mode is selected by the use of the mode setting push button switch 72. This causes the indicator lamp 74c to be turned on. After that, the procedures for the AC TIG high frequency start welding mode are followed.

Welding is carried out under any of set welding conditions each including a welding mode and parameter values for that welding mode. When the main supply switch 1 of the power supply apparatus is turned off after the welding under a particular set condition has finished, or after various parameters have been set in the above-described manner, the set welding condition including the welding mode and the values of various parameters is stored and held in the memory 105. For example, let it be assumed that, when the main supply switch 1 of the power supply apparatus, which has been turned off after the high frequency TIG welding is finished, is turned on again later, the apparatus is automatically set with the previous high frequency TIG welding condition including the same, previous parameters, and the welding is carried out under the same welding condition as the previous welding condition.

Needless to say, sometimes, welding should be done under a different welding condition than the condition for the preceding welding. According to the present invention, in order for a welding condition to be able to be changed, a plurality of welding conditions including a welding mode, a current mode for the respective one of the set welding modes, and set values of various parameters for the respective welding modes, which are set through the use of the control panel 96 of the power supply apparatus, are registered and stored together in the memory 105.

In order to register and store welding conditions for a plurality of welding modes, a desired one of welding modes is selected, and a current mode in the selected welding mode and various parameters are set, and, after that, the storage instruction means, e.g. the welding condition storing push button 106, is pressed to set the registration number therefore. Thereafter, the setter 66 is pressed to actuate the switch 70, whereby the welding condition is stored under the set registration number. Similar setting procedure is repeated for other welding condition. Thus, plural welding conditions are registered and stored under different registration numbers.

When it is desired to do welding under a welding condition different from a preceding one, the desired welding condition is read out from the memory 105. For it, reading instruction means, e.g. readout push button switch 107, is pressed, and the setter 66 is used to designate the desired registration number. Then, the push button switch 70 is actuated by pressing the setter 66, and the desired welding condition stored in the designated registration number is read out. Then, the welding can be performed under the read out welding condition.

When the welding condition for the preceding welding cannot be used, or any of the registered welding conditions cannot be used, all the values of the respective parameters, beginning with the setting of the desired welding mode, are set anew. In such a case, when, for example, a standard TIG welding mode is selected, the magnitudes of base current, initial current and crater current and the length of the after-flow time period are automatically set in accordance with the set peak current value, and the hot start current value, the pulse width, the pre-flow time period, the up-ramping time period and the down-ramping time period are fixed to respective predetermined values. Other parameters, such as the up-ramping and down-ramping time periods, may be automatically set also in response to the setting of the peak current value.

Examples of the respective parameters set in response to the setting of the peak current may be as follows.

Set Peak Current: IP
Base Current: $IB=(1/4) \times IP$
Initial Current: $IS=(1/3) \times IP$
Crater Current: $IC=(1/3) \times IP$
After-Flow Time: Automatically set to a time in a range between 5.0 seconds and 30.0 seconds, for IP=from 5 A to 200 A
Hot Current: 20 A (Fixed)
Pulse Width: Duty Cycle of 50%
Pre-Flow Time: 0.1 seconds
Up-ramping Time: $TU=(1/100) \times IP$
Down-ramping Time: $TD=(2/10) \times IP$ Although the present invention has been described in terms of manual welding and TIG welding, the present invention is not limited to them, but can be employed for MIG welding and MAG welding, too. Furthermore, the controller 66b of the setter 66 has been described as a rotating knob, but it may be a slider-type controller.

What is claimed is:

1. A power supply apparatus for use with a welding machine, comprising:
   a power supply input terminal to which a commercial AC power supply is coupled, and a main power switch coupled to said power supply input terminal, a desired one of welding conditions including welding modes and various parameters being set in said power supply apparatus, said power supply apparatus providing a welding output in accordance with the welding condition set therein;
   a control panel unit for use in setting said desired one of said welding conditions in said power supply apparatus; and
   memory means for storing, when said main power switch is turned off, the welding condition set in said power supply apparatus when said main power switch is turned off, wherein the welding condition stored in said memory means is set in said power supply apparatus when said main power supply switch is next turned on;
   wherein, when the peak current for a desired welding mode is set in said power supply apparatus, a base current, an initial current, a crater current, and an after-flow time period, for said set peak current, are automatically set, and a hot-start current, a pulse width, a pre-flow time period, an up-ramping time period, and a down-ramping time period are set to respective predetermined fixed values.

2. A power supply apparatus for use with a welding machine, comprising:
   a power supply input terminal to which a commercial AC power supply is coupled, and a main power switch coupled to said power supply input terminal, a desired one of welding conditions including welding modes and various parameters being set in said power supply apparatus, said power supply apparatus providing a welding output in accordance with the welding condition set therein;

a control panel unit for use in setting said desired one of said welding conditions in said power supply apparatus; and memory means for storing, when said main power switch is turned off, the welding condition set in said power supply apparatus when said main power switch is turned off, wherein the welding condition stored in said memory means is set in said power supply apparatus when said main power supply switch is next turned on; wherein, when the peak current for a desired welding mode is set in said power supply apparatus, a base current, an initial current, a crater current, an after-flow time period, an up-ramping time period, and a down-ramping time period, for said set peak current, are automatically set, and a hot-start current, a pulse-width, and a pre-flow time period are set to respective predetermined fixed values.

* * * * *